United States Patent
Yan

(10) Patent No.: US 10,871,930 B2
(45) Date of Patent: Dec. 22, 2020

(54) DISPLAY METHOD AND DISPLAY APPARATUS

(71) Applicant: SHENZHEN SKYWORTH-RGB ELECTRONIC CO., LTD., Shenzhen (CN)

(72) Inventor: Ge Yan, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 25 days.

(21) Appl. No.: 16/083,738

(22) PCT Filed: Sep. 9, 2016

(86) PCT No.: PCT/CN2016/098554
§ 371 (c)(1),
(2) Date: Sep. 10, 2018

(87) PCT Pub. No.: WO2017/152603
PCT Pub. Date: Sep. 14, 2017

(65) Prior Publication Data
US 2019/0073177 A1    Mar. 7, 2019

(30) Foreign Application Priority Data
Mar. 10, 2016   (CN) .......................... 2016 1 0135851

(51) Int. Cl.
*G06F 3/14*      (2006.01)
*G06F 16/432*    (2019.01)
(Continued)

(52) U.S. Cl.
CPC .......... *G06F 3/1423* (2013.01); *G06F 16/334* (2019.01); *G06F 16/338* (2019.01);
(Continued)

(58) Field of Classification Search
CPC combination set(s) only.
See application file for complete search history.

(56) References Cited

U.S. PATENT DOCUMENTS 6,272,461 B1    8/2001  Meredith et al.
9,026,915 B1    5/2015  Ehlen et al.
(Continued)

FOREIGN PATENT DOCUMENTS

| CN | 103379460 | 10/2013 |
| CN | 104125334 | 10/2014 |

(Continued)

OTHER PUBLICATIONS

Ryba et al. Liberated learning Analysis of University Students (English Machine translation) (Year: 2015).*
(Continued)

*Primary Examiner* — Van N Chow
(74) *Attorney, Agent, or Firm* — Hauptman Ham, LLP

(57) ABSTRACT

Disclosed is a display method that includes: controlling a recording device to perform a real-time recording operation on a current environment when a preset type of display data is displayed on a first display interface; and performing character recognition on audio information obtained by the recording operation to obtain text information, and displaying the obtained text information on a second display interface. Further disclosed is a display apparatus.

9 Claims, 3 Drawing Sheets

(51) Int. Cl.
*G06F 16/438* (2019.01)
*G10L 15/26* (2006.01)
*G06F 16/33* (2019.01)
*G06F 16/338* (2019.01)

(52) U.S. Cl.
CPC ........ *G06F 16/433* (2019.01); *G06F 16/4393* (2019.01); *G10L 15/26* (2013.01)

(56) References Cited

U.S. PATENT DOCUMENTS

| | | | |
|---|---|---|---|
| 2007/0188599 A1* | 8/2007 | Kenoyer | H04N 7/15 348/14.08 |
| 2014/0173647 A1* | 6/2014 | Hansson | H04N 21/4622 725/19 |
| 2015/0310637 A1* | 10/2015 | Zhong | G06T 11/001 348/207.1 |
| 2017/0131961 A1* | 5/2017 | Sugaya | G10L 15/26 |
| 2017/0168595 A1* | 6/2017 | Sakaguchi | G06F 3/167 |

FOREIGN PATENT DOCUMENTS

| | | |
|---|---|---|
| CN | 105808733 | 7/2016 |
| EP | 2320333 | 5/2011 |
| GB | 2302199 A | 1/1997 |
| WO | 2015000430 A1 | 1/2015 |

OTHER PUBLICATIONS

International search report dated Dec. 7, 2016 from corresponding application No. PCT/CN2016/098554.
Chen et al., C.D., "Incorporating a smart classroom 2.0 Speech-Driven PowerPoint System (SDPPT) into university teaching," Smart Learning Environments, (2015), 2:7, pp. 1-11.
Ryba et al., K., "Liberated Learning: Analysis of University Students' Perceptions and Experiences with Continuous Automated Speech Recognition," vol. 9, No. 1, Mar. 2005, pp. 1-19.
European Search Report issued in corresponding European Patent Application No. 16893248.1 dated Aug. 13, 2019, pp. 1-9, European Patent Office, Munich, Germany.

* cited by examiner

DISPLAY METHOD AND DISPLAY APPARATUS

CROSS-REFERENCE TO RELATED APPLICATIONS

The present application is the National Stage of International Application No. PCT/CN2016/098554, filed Sep. 9, 2016, which claims the benefit of China Patent Application No. 201610135851.6, filed Mar. 10, 2016 with the State Intellectual Property Office of China and entitled "Display Method and Display Apparatus".

TECHNICAL FIELD

The present disclosure relates to the field of data display technologies, and more particularly relates to a display method and a display apparatus.

BACKGROUND

Oftentimes when a conference is held in an environment such as a conference room, a user typically displays a file such as a PowerPoint (PPT) file on a display screen, a fluorescent screen or the like, and then makes a presentation according to the contents of the PPT file. However, while speaking according to the contents of the PPT file, the user typically needs to write the key points of the speech on a blackboard or whiteboard in order to facilitate the explanation of the contents of e.g. the PPT file. As such a conference mode requires the speaker to handwrite the relevant contents, in the cases where there are too many contents that need to be written, the long periods of writing would adversely affect the fluency of the conference, thereby reducing the efficiency of the conference.

SUMMARY

The present disclosure therefore provides a display method and a display apparatus, which are intended to solve the technical problem that when a conference is held in an environment such as a conference room, the fluency of the conference is adversely affected thus leading to reduced efficiency of the conference due to too many written contents.

To achieve the above object, the present disclosure provides a display method that includes the following operations:

when a preset type of display data is displayed on a first display interface, controlling a recording device to perform a real-time recording operation on a current environment;

performing character recognition on audio information obtained by the recording operation to obtain text information, and displaying the obtained text information on a second display interface.

In some embodiments, the block of "displaying the obtained text information on a second display interface" typically includes the following operations:

calculating a number of occurrences of each word or sentence in the text information;

obtaining the word or sentence in the text information that occurs more than a preset number of times; and displaying the obtained text information on the second display interface, and highlighting the word or sentence that occurs more than the preset number of times.

In some embodiments, when the preset type of display data is a PowerPoint (PPT) file, the block of "displaying the obtained text information on the second display interface" typically includes the following operations:

obtaining each heading of the PPT file;

searching in the text information for text that matches each heading of the PPT file; and respectively displaying the found text in a display area corresponding to each heading of the PPT file, and displaying text in the text information other than the found text on the second display interface.

In some embodiments, the display method typically includes the following operations subsequent to the block of "displaying the obtained text information on a second display interface":

displaying the text information on the first display interface when playback of the PPT file ends.

In some embodiments, the display method further includes the following operations:

when the preset type of display data is displayed on the first display interface, adjusting brightness of lighting equipment in the current environment to a preset brightness.

In addition, in order to achieve the above object, the present disclosure further provides a display device that includes:

a recording module, configured to control a recording device to perform a real-time recording operation on the current environment when a preset type of display data is displayed on a first display interface; and a recognition module, configured to perform character recognition on audio information obtained by the recording operation to obtain text information, and display the obtained text information on a second display interface.

In some embodiments, the recognition module includes:

a calculation unit, configured to calculate a number of occurrences of each word or sentence in the text information;

a first acquisition unit, configured to obtain the word or sentence in the text information that occurs more than a preset number of times; and a first display unit, configured to display the obtained text information on the second display interface, and highlight the word or sentence that occurs more than the preset number of times.

In some embodiments, when the preset type of display data is a PPT (PowerPoint) file, the recognition module includes:

a second acquisition unit, configured to obtain each heading of the PPT file;

a searching unit, configured to search in the text information for text that matches each heading of the PPT file; and a second display unit, configured to respectively display the found text in a display area corresponding to each heading of the PPT file, and display text in the text information other than the found text on the second display interface.

In some embodiments, the recognition module further includes:

a third display unit, configured to display the text information on the first display interface when playback of the PPT file ends.

In some embodiments, the display apparatus further includes:

an adjustment module, configured to adjust brightness of lighting equipment in the current environment to a preset brightness when the preset type of display data is displayed on the first display interface.

According to this disclosure, when a preset type of display data is displayed on a first display interface, a recording device is controlled to perform a real-time recording operation on the current environment. Then character recognition is performed with the audio information obtained by the recording operation so as to obtain text information, and further the obtained text information is displayed on a second display interface. Thus, it is made possible to display the text information corresponding to the audio information simultaneously while displaying the data to be displayed, and reduce the related contents written on the whiteboard or other devices by the speaker at the time of speaking, thereby improving the efficiency of the conference.

BRIEF DESCRIPTION OF THE ACCOMPANYING DRAWINGS

Various implementations for achieving the objects, functional features, and advantages of this disclosure will now be described in further detail in connection with embodiments and the accompanying drawings.

DETAILED DESCRIPTION OF ILLUSTRATIVE EMBODIMENTS

It will be appreciated that the specific embodiments described herein are merely illustrative of the present disclosure and are not intended to limit the disclosure.

Figure 1:
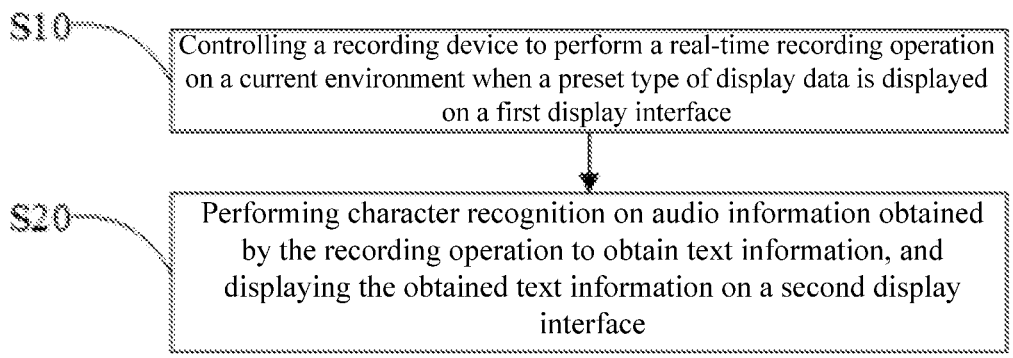
FIG. 1 is a flowchart a first embodiment of a display method in accordance with the present disclosure.

The present disclosure provides a display method. Referring now to FIG. 1, there is shown a flowchart a first embodiment of a display method in accordance with the present disclosure.

In this embodiment, display method includes the following blocks S10 and S20.

In S10, the display method includes: when a preset type of display data is displayed on a first display interface, controlling a recording device to perform a real-time recording operation on a current environment.

The display method of this embodiment is applicable to a display device such as a projector, a smart television (TV), a smart display, etc. When data or a file needs to be projected or displayed, the user can send a display instruction to a corresponding processor of the display device such as a projector, a smart TV, a smart display, etc. Upon receiving the display instruction, the processor acquires the data to be displayed corresponding to the display instruction, where the preset type of display data includes a PowerPoint (PPT) file, a word file, a PDF file, and the like. The display method of this embodiment is applicable to a conference room, a conference venue, and the like. In this embodiment, the display device includes a plurality of display interfaces or includes a plurality of display screens. The processor controls the display device to display the data to be displayed on a first display interface thereof. For example, in one instance, the display device includes a smart TV, a smart display screen, a fluorescent screen, etc., and the processor can control the smart TV, the smart display screen, or the fluorescent screen to display the data to be displayed. The operating setting of the embodiment is further provided with a recording device connected to the processor. When the preset type of display data is displayed on the first display interface, the processor can control the recording device to perform a real-time recording operation on the current environment, thereby enabling real-time recoding when the user is speaking. The display method then proceeds to block S20.

In S20, the display method includes: performing character recognition on audio information obtained by the recording operation to obtain text information, and displaying the obtained text information on a second display interface.

In this embodiment, an existing voice recognition algorithm may be used to perform character recognition on the audio information obtained by the recording operation, to convert the audio information into text information, and display the obtained text information on the second display interface. The first display interface and the second display interface may be two different display areas of the same display device, or may be display areas of two different display devices.

Further, in one embodiment, the display method further includes: when the preset type of display data is displayed on the first display interface, adjusting brightness of lighting equipment in the current environment to a preset brightness. Correspondingly, the brightness of the lighting equipment active in the current environment can be restored after the display device is turned off or after display of the text information and information waiting to be displayed ends.

Thus, the brightness of the lighting equipment in the current environment is adjusted to the preset brightness when displaying the preset type of display data on the first display interface. For example, the power of the lighting equipment active in the current environment may be reduced so as to dim the lighting in the current environment reducing the brightness of the current environment, thereby improving the clarity of the data/text displayed on the first display interface and the second display interface, and thus improving the visual effects for the user. The preset brightness may be a brightness under which the user can gain superior visual effects when viewing the first display interface and the second display interface in the current environment. After the display of the data/text on the first display interface and the second display interface is completed, the brightness of the lighting equipment active in the current environment is restored. That is, the brightness of the lighting equipment active in the current environment is adjusted to the brightness before the adjustment, so as to ensure the brightness of the previous environment when the display is completed.

Further, in another embodiment, the display method further includes the following operation subsequent to block S20: storing the text information. That is, the text information obtained by text recognition of the audio information is stored, so as to reduce manual recording of the speaker's speech content by the participants, which improves the efficiency of records in the meeting.

According to this embodiment, when a preset type of display data is displayed on a first display interface, a recording device is controlled to perform a real-time recording operation on the current environment. Then character recognition is performed with the audio information obtained by the recording operation so as to obtain text information, and further the obtained text information is displayed on a second display interface. Thus, it is made possible to display the text information corresponding to the audio information simultaneously while displaying the data to be displayed, and reduce the related contents written on the whiteboard or other devices by the speaker at the time of speaking, thereby improving the efficiency of the conference.

Figure 2:
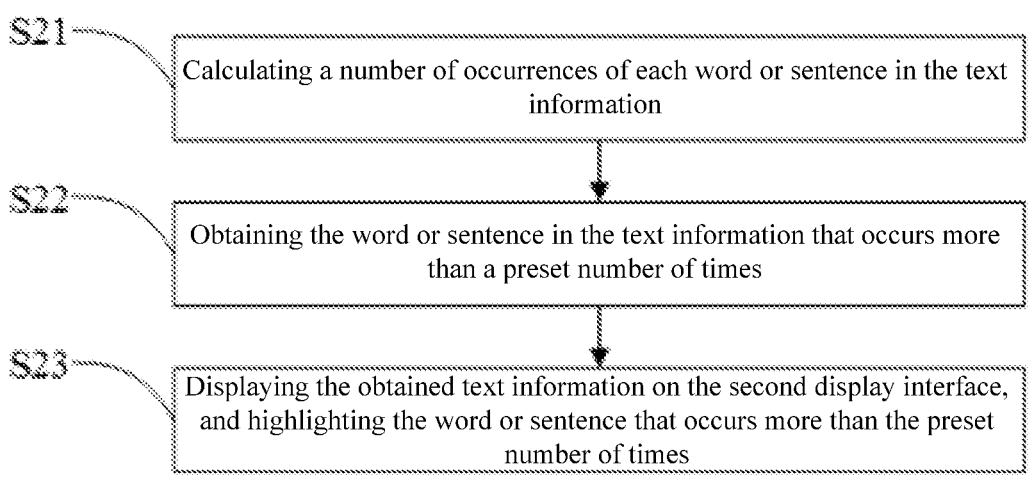
FIG. 2 is a detailed flowchart illustrating the block of "displaying the obtained text information on a second display interface" in a second embodiment of the display method in accordance with the present disclosure.

A second embodiment of the display method in accordance with the present disclosure is provided on the basis of the first embodiment, as illustrated in FIG. 2. In this embodiment, block S20 includes the following operations S21 to S23.

In S21, the block includes: calculating a number of occurrences of each word or sentence in the text information.

In this embodiment, when the text information is obtained by character recognition on the audio information, the number of occurrences of each word or sentence in the text information is calculated. Certainly, the occurrences of all the words or sentences in the text information obtained by character recognition on the audio information may also be calculated.

In S22, the block includes: obtaining the word or sentence in the text information that occurs more than a preset number of times.

The preset number of times can be set by the user. The processor thus obtains the words or sentences in the text information that occurs more than the preset number of times, based on the calculated number of occurrences of the words or sentences in the text information.

In S23, the block includes: displaying the obtained text information on the second display interface, and highlighting the word or sentence that occurs more than the preset number of times.

By highlighting the words or sentences that occur more than the preset number of times, it means that the words or sentences that occur more than the preset number of times may be displayed in bold, italicized, underlined, or enlarged, and so on.

In this embodiment, the occurrences of various words or sentences in the text information are calculated, and then those words or sentences that occur more than the preset number of times in the text information are obtained. Further the obtained text information is displayed on the second display interface, while those words or sentences that occur more than the preset number of times are highlighted. This makes it possible to highlight the words or sentences that occur more than a preset number of times, thereby reflecting the key points of the speaker's speech and so improving the efficiency of the conference.

Figure 3:
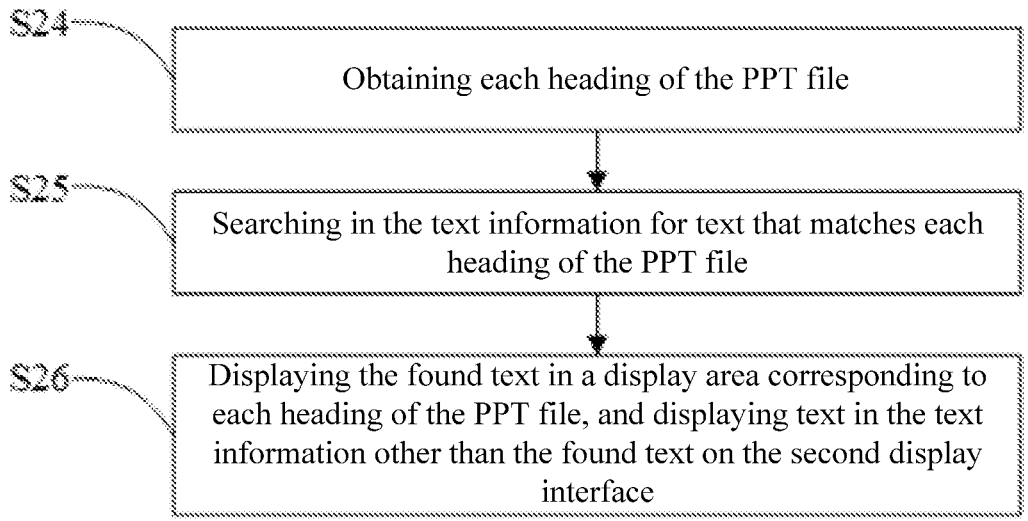
FIG. 3 is a detailed flowchart illustrating the block of "displaying the obtained text information on a second display interface" in a third embodiment of the display method in accordance with the present disclosure.

A third embodiment of the display method in accordance with the present disclosure is provided on the basis of the first embodiment, as illustrated in FIG. 3. In this embodiment, block S20 includes the following operations S24 to S26 when the preset type of display data is a PPT file.

In S24, the block includes: obtaining each heading of the PPT file.

It is easy to understand that, a PPT file generally contains titles of various levels. Thus, when the PPT file is displayed, the various titles of the PPT file are acquired, including the titles of various levels of the PPT file.

In S25, the block includes: searching in the text information for text that matches each heading of the PPT file.

The text information obtained by the character recognition of the audio information is searched for the text that matches the various headings of the PPT file, for example, a sentence that contains a certain heading.

In S26, the block includes: respectively displaying the found text in a display area corresponding to each heading of the PPT file, and displaying text in the text information other than the found text on the second display interface.

The display area corresponding to each heading of the PPT file may be a blank display area around this heading. Accordingly, the found text is displayed in the display area corresponding to each heading of the PPT file, and the text in the text information other than the found text is displayed on the second display interface. Thus, the participants would be able to clearly view the text information corresponding to the PPT file.

Further, in other embodiments, the display method may further include the following operation subsequent to S26: displaying the text information on the first display interface when playback of the PPT file ends. Oftentimes when participating in a conference, the user generally would make a corresponding summary, etc. after the playback of the PPT file ends. Therefore, the text information is displayed on the first display interface, so that all participants can view the text information of the user's speech when the user gives a summary.

According to this embodiment, various headings of the PPT file are first obtained. Then the text information is searched for the text that matches each of the various headings of the PPT file. Then the text found is displayed in the display area corresponding to this heading of the PPT file, while the text other than the found text in the text information is displayed on the second display interface. Thus, the text that matches the various headings of the PPT file can be displayed in the respective display areas of the various headings of the PPT file, enabling the participants of the conference to clearly view the text information corresponding to the PPT file, thereby improving the efficiency of the conference.

Figure 4:
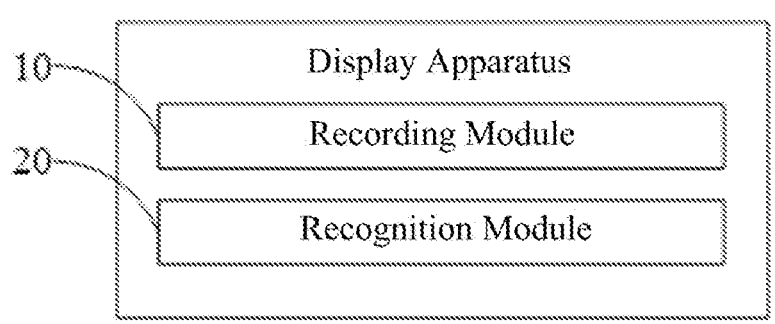
FIG. 4 is a block diagram illustrating a first embodiment of a display apparatus in accordance with the present disclosure.

This disclosure further provides a display apparatus. Referring now to FIG. 4, there is shown a block diagram illustrating a first embodiment of a display apparatus in accordance with the present disclosure.

In this embodiment, the display apparatus includes a recording module 10 and a recognition module 20.

The recording module 10 is configured to control a recording device to perform a real-time recording operation on the current environment when a preset type of display data is displayed on a first display interface.

The display method of this embodiment is applicable to a display device such as a projector, a smart television (TV), a smart display, etc. When data or a file needs to be projected or displayed, the user can send a display instruction to a corresponding processor of the display device such as a projector, a smart TV, a smart display, etc. Upon receiving the display instruction, the processor acquires the data to be displayed corresponding to the display instruction, where the preset type of display data includes a PPT file, a word file, a PDF file, and the like. The display method of this embodiment is applicable to a conference room, a conference venue, and the like. In this embodiment, the display device includes a plurality of display interfaces or includes a plurality of display screens. The processor controls the display device to display the data to be displayed on a first display interface thereof. For example, in one instance, the display device includes a smart TV, a smart display screen, a fluorescent screen, etc., and the processor can control the smart TV, the smart display screen, or the fluorescent screen to display the data to be displayed. The operating setting of the embodiment is further provided with a recording device connected to the processor. When the preset type of display data is displayed on the first display interface, the processor can control the recording device to perform a real-time recording operation on the current environment, thereby enabling real-time recoding when the user is speaking.

The recognition module is configured to perform character recognition on audio information obtained by the recording operation to obtain text information, and display the obtained text information on a second display interface.

In this embodiment, the recognition module 20 may use an existing voice recognition algorithm to perform character recognition on the audio information obtained by the recording operation so as to convert the audio information into text information, and further display the obtained text information on the second display interface. The first display interface and the second display interface may be two different display areas of the same display device, or may be display areas of two different display devices.

Further, in one embodiment, the display apparatus may further include an adjustment module configured to adjust brightness of lighting equipment in the current environment to a preset brightness when the preset type of display data is displayed on the first display interface. Correspondingly, the brightness of the lighting equipment active in the current environment can be restored after the display device is turned off or after display of the text information and information waiting to be displayed ends.

Thus, the brightness of the lighting equipment in the current environment is adjusted by the adjustment module to the preset brightness when displaying the preset type of display data on the first display interface. For example, the power of the lighting equipment active in the current environment may be reduced so as to dim the lighting in the current environment reducing the brightness of the current environment, thereby improving the clarity of the data/text displayed on the first display interface and the second display interface, and thus improving the visual effects for the user. The preset brightness may be a brightness under which the user can gain superior visual effects when viewing the first display interface and the second display interface in the current environment. After the display of the data/text on the first display interface and the second display interface is completed, the brightness of the lighting equipment active in the current environment is restored. That is, the brightness of the lighting equipment active in the current environment is adjusted to the brightness before the adjustment, so as to ensure the brightness of the previous environment when the display is completed.

According to this embodiment, when a preset type of display data is displayed on a first display interface, recording module 10 controls a recording device to perform a real-time recording operation on the current environment. Then recognition module 20 performs character recognition on the audio information obtained by the recording operation so as to obtain text information, and further displays the obtained text information on a second display interface. Thus, it is made possible to display the text information corresponding to the audio information simultaneously while displaying the data to be displayed, and reduce the related contents written on the whiteboard or other devices by the speaker at the time of speaking, thereby improving the efficiency of the conference.

Figure 5:
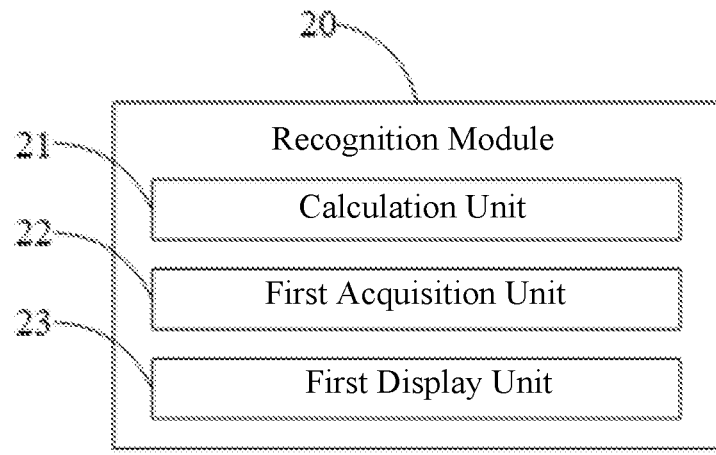
FIG. 5 is a detailed block diagram illustrating a recognition module in a second embodiment of the display apparatus in accordance with the present disclosure.

A second embodiment of the display apparatus in accordance with the present disclosure is provided on the basis of the first embodiment, as illustrated in FIG. 5. In this embodiment, the recognition module 20 includes a calculation unit 21, a first acquisition unit 22, and a first display unit 23.

The calculation unit 21 is configured to calculate a number of occurrences of each word or sentence in the text information.

In this embodiment, when the text information is obtained by character recognition on the audio information, the calculation unit 21 calculates the number of occurrences of each word or sentence in the text information. Certainly, the occurrences of all the words or sentences in the text information obtained by character recognition on the audio information may also be calculated.

The first acquisition unit 22 is configured to obtain the word or sentence in the text information that occurs more than a preset number of times.

The preset number of times can be set by the user. The processor thus obtains the words or sentences in the text information that occur more than the preset number of times, based on the calculated number of occurrences of the words or sentences in the text information.

The first display unit 23 is configured to display the obtained text information on the second display interface, and highlight the word or sentence that occurs more than the preset number of times.

By the first display unit 23 highlighting the words or sentences that occur more than the preset number of times, it means that the words or sentences that occur more than the preset number of times may be displayed in bold, italicized, underlined, or enlarged, and so on.

In this embodiment, the calculation unit 21 calculates the occurrences of various words or sentences in the text information, and then the first acquisition unit 22 obtains those words or sentences that occur more than the preset number of times in the text information. Further the first display unit 23 displays the obtained text information on the second display interface, while highlighting those words or sentences that occur more than the preset number of times. This makes it possible to highlight the words or sentences that occur more than a preset number of times, thereby reflecting the key points of the speaker's speech and so improving the efficiency of the conference.

Figure 6:
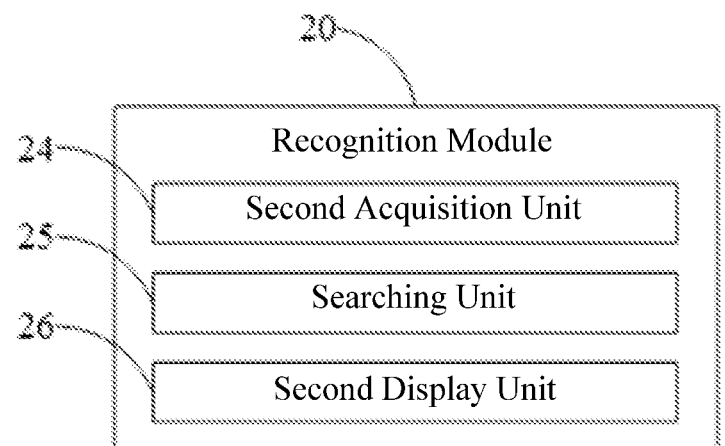
FIG. 6 is a detailed block diagram illustrating a recognition module in a third embodiment of the display apparatus in accordance with the present disclosure.

A third embodiment of the display apparatus in accordance with the present disclosure is provided on the basis of the first embodiment, as illustrated in FIG. 6. In this embodiment, the recognition module 20 includes a second acquisition unit 24, a searching unit 25, and a second display unit 26.

The second acquisition unit 24 is configured to obtain each heading of the PPT file.

It is easy to understand that, a PPT file generally contains titles of various levels. Thus, when the PPT file is displayed, the various titles of the PPT file are acquired, including the titles of various levels of the PPT file.

The searching unit 25 is configured to search in the text information for text that matches each heading of the PPT file.

The text information obtained by the character recognition of the audio information is searched for the text that matches the various headings of the PPT file, for example, a sentence that contains a certain heading.

The second display unit 26 is configured to respectively display the found text in a display area corresponding to each heading of the PPT file, and display text in the text information other than the found text on the second display interface.

The display area corresponding to each heading of the PPT file may be a blank display area around this heading. Accordingly, the second display unit 26 displays the found text in the display area corresponding to each heading of the PPT file, and displays the text in the text information other than the found text on the second display interface. Thus, the participants would be able to clearly view the text information corresponding to the PPT file.

Further, in other embodiments, the recognition module may further include a third display unit configured to display the text information on the first display interface when playback of the PPT file ends. Oftentimes when participating in a conference, the user generally would make a corresponding summary, etc. after the playback of the PPT file ends. Therefore, the text information is displayed on the first display interface, so that all participants can view the text information of the user's speech when the user gives a summary.

According to this embodiment, the second acquisition unit 24 obtains various headings of the PPT file are first obtained. Then the searching unit searches the text information for the text that matches each of the various headings of the PPT file. Then the second display unit 26 displays the found text in the display area corresponding to this heading of the PPT file, while displays the text other than the found text in the text information on the second display interface. Thus, the text that matches the various headings of the PPT file can be displayed in the respective display areas of the various headings of the PPT file, enabling the participants of the conference to clearly view the text information corresponding to the PPT file, thereby improving the efficiency of the conference.

As used herein, the terms "including," "comprising," or any other variants thereof are intended to encompass a non-exclusive inclusion, so that processes, methods, articles, or devices that include a series of elements will include not only those elements, but also other elements that haven't been explicitly listed or those that are inherent in such processes, methods, articles, or devices. In the absence of additional restrictions, an element defined by the phrase as "including/comprising a . . . " will not preclude the existence of additional such elements in the processes, methods, articles, or devices that include this element.

The foregoing numbering of embodiments of this disclosure is intended for illustrative purposes only, and is not meant to indicate the pros and cons of these embodiments.

By the foregoing description of the implementations, it will be evident to those skilled in the art that the methods according to the above embodiments can be implemented by means of software plus the necessary general-purpose hardware platform; of course they can also be implemented by hardware, but in many cases the former will be the more advantageous implementations. Based on such an understanding, the essential technical solution according to this disclosure, or the portion that contributes to the prior art may be embodied as software products. Computer software products can be stored in a storage medium (e.g., a ROM/RAM, a magnetic disk, an optical disc) and may include multiple instructions that, when executed, can cause a terminal device (e.g., a mobile phone, a computer, a server, an air conditioner, a network device, or the like), to execute the methods as described in the various embodiments of this disclosure.

Furthermore, it will be apparent to those skilled in the art that this disclosure also provides a display apparatus that includes a non-transitory program storage medium and one or more processors. The non-transitory program storage medium stores program code executable by the one or more processors to perform the operations of the various methods described above. In addition, it will be apparent to those skilled in the art that various modules or units 10, 20, 21, 22, 23, 24, 25, and 26 as illustrated in FIGS. 4 through 6 can be software modules or software units. In another aspect, it is well-known that various software modules or units inherently can be stored in the non-transitory program storage medium and executed by the one or more processors.

The foregoing description merely portrays some exemplary embodiments according to this disclosure and is not intended to limit the patentable scope of this disclosure. Any equivalent structural or equivalent flow transformations that are made taking advantage of the present specification and the accompanying drawings and any direct or indirect applications of the present disclosure in other related technical fields shall all fall in the patentable scope of protection of this disclosure.

What is claimed is:

1. A display method, comprising:
controlling a recording device to perform a real-time recording operation on a current environment when a preset type of display data is displayed on a first display interface, wherein the preset type of display data is a PowerPoint (PPT) file; performing character recognition on audio information obtained by the recording operation, to convert the audio information into text information;
obtaining headings of the PPT file;
searching in the text information for text that matches each of the headings of the PPT file to obtain matched texts; and
respectively displaying each of the obtained matched texts in a display area corresponding to each of the
headings of the PPT file on the first display interface, and displaying remaining texts other than the obtained matched texts in the text information on a second display interface;
wherein subsequent to the operation of displaying the remaining texts other than the obtained matched texts in the text information on a second display interface, the display method further comprises:
displaying the text information on the first display interface when playback of the PPT file ends.

2. The display method as recited in claim 1, wherein the operation of displaying remaining texts other than the obtained matched texts in the text information on a second display interface comprises:
calculating a number of occurrences of each word or sentence in the text information;
obtaining the word or sentence in the text information that occurs more than a preset number of times; and
displaying the obtained text information on the second display interface, and highlighting the word or sentence that occurs more than the preset number of times.

3. The display method as recited in claim 1, further comprising:
when the preset type of display data is displayed on the first display interface, adjusting brightness of lighting equipment in the current environment to a preset brightness.

4. The display method as recited in claim 3, wherein the operation of displaying remaining texts other than the obtained matched texts in the text information on a second display interface comprises:

calculating a number of occurrences of each word or sentence in the text information;

obtaining the word or sentence in the text information that occurs more than a preset number of times; and displaying the obtained text information on the second display interface, and highlighting the word or sentence that occurs more than the preset number of times.

5. The display method as recited in claim 3, wherein subsequent to the operation of displaying remaining texts other than the obtained matched texts in the text information on a second display interface, the display method further comprises:

displaying the text information on the first display interface when playback of the PPT file ends.

6. A display apparatus, comprising one or more processors and a non-transitory program storage medium storing program code executable by the one or more processors, the program code comprising:

a recording module, configured to control a recording device to perform a real-time recording operation on a current environment when a preset type of display data is displayed on a first display interface, wherein the preset type of display data is a PowerPoint (PPT) file; and a recognition module, configured to perform character recognition on audio information obtained by the recording operation, to convert the audio information into text information;

the recognition module comprising a second acquisition unit, a searching unit, and a second display unit, wherein:

the second acquisition unit is configured to obtain headings of the PPT file;

the searching unit is configured to search in the text information for text that matches each heading of the PPT file to obtain matched texts; and the second display unit is configured to respectively display each of the obtained matched texts in a display area corresponding to each of the headings of the PPT file on the first display interface, and displaying remaining texts other than the obtained matched texts in the text information on a second display interface;

wherein the recognition module further comprises:

a third display unit, configured to display the text information on the first display interface when playback of the PPT file ends.

7. The display apparatus as recited in claim 6, wherein the recognition module comprises:

a calculation unit, configured to calculate a number of occurrences of each word or sentence in the text information;

a first acquisition unit, configured to obtain the word or sentence in the text information that occurs more than a preset number of times; and a first display unit, configured to display the obtained text information on the second display interface, and highlight the word or sentence that occurs more than the preset number of times.

8. The display apparatus as recited in claim 6, wherein the program code further comprises:

an adjustment module, configured to adjust brightness of lighting equipment in the current environment to a preset brightness when the preset type of display data is displayed on the first display interface.

9. The display apparatus as recited in claim 8, wherein the recognition module comprises:

a calculation unit, configured to calculate a number of occurrences of each word or sentence in the text information;

a first acquisition unit, configured to obtain the word or sentence in the text information that occurs more than a preset number of times; and a first display unit, configured to display the obtained text information on the second display interface, and highlight the word or sentence that occurs more than the preset number of times.

* * * * *